United States Patent [19]

Huybrechts et al.

[11] Patent Number: 4,602,053

[45] Date of Patent: Jul. 22, 1986

[54] CHIP-RESISTANT PAINT CONTAINING EPOXYESTER LINEAR BLOCK OLIGOMER

[75] Inventors: Jozef T. Huybrechts, Turnhout; Ferdinand F. Meeus, Mechlin; August T. Timmerman, Westerlo, all of Belgium

[73] Assignee: E. I. Du Pont de Nemours and Company, Wilmington, Del.

[21] Appl. No.: 613,413

[22] Filed: May 24, 1984

[51] Int. Cl.[4] .................. C08K 3/10; C08L 63/00; C08L 63/02

[52] U.S. Cl. .................... 523/436; 523/427; 523/428; 523/435; 523/438; 523/457; 523/458

[58] Field of Search ............... 523/428, 427, 435, 436, 523/457, 458; 525/438

[56] References Cited

U.S. PATENT DOCUMENTS

| | | | |
|---|---|---|---|
| 2,682,515 | 6/1954 | Naps | 523/428 |
| 3,655,595 | 4/1972 | Higashi | 428/478.2 |
| 3,819,567 | 6/1974 | Swanson et al. | 525/438 |
| 3,837,981 | 9/1974 | Flint | 428/189 |
| 3,928,156 | 12/1975 | Wismer et al. | 524/901 |
| 3,971,745 | 7/1976 | Carlson et al. | 524/440 |
| 3,992,346 | 11/1976 | Hartmann et al. | 525/438 |
| 4,065,316 | 12/1977 | Baron et al. | 525/481 |
| 4,115,599 | 9/1978 | Taylor | 525/524 |
| 4,160,064 | 7/1979 | Nodiff | 428/207 |
| 4,225,460 | 9/1980 | Newell | 528/73 |
| 4,237,252 | 12/1980 | Newell et al. | 528/58 |
| 4,354,911 | 10/1982 | Dodd et al. | 427/304 |
| 4,450,200 | 5/1984 | Iwato et al. | 428/323 |

FOREIGN PATENT DOCUMENTS 0042625  4/1979  Japan ........................ 523/427

*Primary Examiner*—Herbert J. Lilling
*Attorney, Agent, or Firm*—Richard H. Burgess

[57] ABSTRACT

An epoxyester linear block oligomer made with n−1 moles fatty acid units terminated with carboxylic acid groups and n moles of epoxy oligomer is particularly suited for chip-resistant paints made with a low pigment volume concentration.

4 Claims, No Drawings

CHIP-RESISTANT PAINT CONTAINING EPOXYESTER LINEAR BLOCK OLIGOMER

BACKGROUND

This invention concerns polymers and paints. More particularly it concerns polyesterepoxy polymers particularly suited for use in chip resistant coating compositions for use on automobiles.

Coating systems for automobiles normally comprise a multiplicity of coatings applied to a steel substrate. Typically, the steel is treated with a phosphate, then a cathodic electrocoat primer is applied. A primer-surfacer is used next to smooth the surface and provide a thick enough coating to permit sanding to a smooth, flat finish. Then a top-coat system is applied, sometimes as a single colored coat, often as a base coat with solid color or metallic pigments followed by a clear coat.

In automobiles, a critical area for such coating systems is the lower part of the car including the rocker panels. Stones and debris from the road can cause chipping of the paint, particularly in those areas.

One solution to the chipping problem is to use a relatively thick, soft, mastick-like composition as the primer surfacer. However, the edge between such a thick coating and the thinner, smooth finish on the rest of the car is apt to create an appearance problem for the designers. While the edge can be masked with trim or molding, it would be desirable to have a thin chip-resistant primer surfacer with less of such interface problems.

The task of developing a thin, chip-resistant paint is difficult. Many paint resin systems are too brittle for such purposes. And the normal pigmentation of such paints often contributes to brittleness.

SUMMARY OF THE INVENTION

The present invention provides a polymer in the form of a block-cocondensed linear oligomer having an average of 3 to 20 units of alternating units of (1) n linear epoxy oligomers terminated with oxirane groups on each end and an $\overline{Mn}$ in the range of 300–2000, and (2) n−1 number of fatty acid units terminated with carboxylic acid groups on each of two ends and having at least 9, preferably 18, carbon atoms, said linear oligomer being terminated on each end with units of said epoxy oligomers. Preferably the oligomer contains 3–10 units, more preferably 7.

Chip-resistant coating compositions made with such polymers preferably contain small pigment volume concentrations (PVC) up to 20%, preferably about 5%.

DETAILED DESCRIPTION

Efforts to make thin, chip-resistant primer surfacers have used different polymer systems. Polyesters made from various combinations of phthalic anhydride, terephthalic acid, isophthalic acid (IPA) and adipic, azeleic, or dodecanedioic acid reacted with neopentyl glycol (NPG) and trimethylol propane (TMP) gave chip results on a Gravelometer of 3 to 5, with 1 being outstanding and 7 very bad. One of the best of these compositions used 7 moles NPG and 3 moles TMP as the alcohol portion, with 2 moles IPA and 1 mole azeleic acid.

The Gravelometer test involves dropping 1 kg of screws 5 m through a tube of 3.8 cm diameter onto a painted surface held at a 45° angle 3 cm below the mouth of the tube. The numerical rating is given by visual comparison with a series of standards. It would be desirable to have a rating less than 3 for automotive use.

The next system tried was a blend of hard and rigid polyesters with soft and flexible polyesters. Again, the best chip rating obtainable was in the range of 3–4.

At this point, an attempt was made to experiment with block copolymers of alternating rigid and flexible units. It was thought that toughness might be increased by providing something similar to a composite material, possessing contrasting characteristics from different constituents.

It was found that a low molecular weight epoxyester oligomer could be made with alternating units of rigid epoxy and elastic $C_{36}$ dimerized fatty acid, with 3 to 20 units total and with the epoxy units terminating each end of the oligomer. With an oligomer formed of 7 units from 4 moles of the condensation product of Epon 1001 epoxy from Shell Chemical Co. with 3 moles Pripol 1014 dimerized fatty acid from Emery Industries Inc., experiments were run at different pigment levels.

Generally, primer surfacers for automotive finishes are thought to be best with PVC's of 20–50%. Most primer surfacers have PVC's of at least 20%. See "Paint Flow and Pigment Dispersion" by T. C. Patton, 2nd Ed, Wiley Interscience Publication (1979). To our surprise, we discovered that primer-surfacers can be made with polymers of the present invention with superior chip resistance in the range of 1–2 if the PVC is kept very low, below 20%, the lower the better, but sufficient pigment is generally needed for hiding, corrosion resistance and other advantageous effects, preferably 1–20%. Thus, about 5% seems best for most purposes.

In combination with other coatings, primer surfacers of the invention can be used unpigmented and pigments with strong hiding capability such as carbon black can be used in particularly low concentration.

Titanium dioxide seems to be the best pigment, and Blanc Fixe or micronized barium sulfate can be used as an extender without detracting very seriously from the properties. Small amounts of carbon black can also be used for improved hiding. With $TiO_2$, a PVC of 20% is equal to a pigment to binder (P/B) weight ratio of about 96%; a PVC of 5% is equal to a P/B of about 20%.

In the tests described above, the primer surfacer was generally applied as part of a system involving: a phosphatized steel substrate, a cathodic electrocoat of 15–20 microns, 30–50 microns primer surfacer, and 50 microns topcoat of the single layer of solid color type.

A PVC of 5% gave a substantially improved balance of hardness and flexibility, and a chip rating of 2, compared to a PVC of 20% with a chip rating of 2–3. However, the PVC of 20% was still superior to prior systems discussed above because of greater hardness and flexibility, even with a chip rating of 2–3.

In the examples, parts and proportions are given by weight except where indicated otherwise.

EXAMPLES

The following compositions are made and used as indicated, giving finishes with good chip resistance.

EXAMPLE 1

Resin A—Block Epoxy Ester from Epon 1001 and Pripol 1014 dimer FA

| | |
|---|---:|
| Epon 1001 epoxy resin (Shell) made by reacting epichlorohydrin and bisphenol A | 33.80 |

-continued

| Pripol 1014 dimerized fatty acid (Unilever) | 16.20 |
|---|---|
| Triethylamine | 0.05 |
| Methylisobutyl ketone (MIBK) | 25 |
| heat at reflux (114–116° C.) until acid number (AN) = 6–10 visc Q–T (Gardner-Holdt bubble viscosity) at 50% solids in MIBK/CA blend = 1/1 | |
| Cellosolve acetate (CA) | 24.95 |
| | 100.00 |

The resulting resin was an oligomer containing 4 moles of Mn 900 epoxy and 3 moles of $C_{36}$ dimerized fatty acid, for a total of 7 mole units, end terminated with epoxy.

EXAMPLE 2

Resin B—Block Epoxy Ester from Epon 1004—dimer FA/Pripol 1014

| Epon 1004 epoxy resin (Shell) made by reacting epichlorohydrin and bisphenol A | 40.11 |
|---|---|
| Pripol 1014 dimerized fatty acid | 9.89 |
| Triethylamine | 0.05 |
| Methylisobutyl ketone | 25 |
| heat at reflux (114–116° C.) until AN = 9–13 at visc V–W at 50% solids in MIBK/PGA = 1/1 | |
| Propyleneglycol methylether acetate (PGA) | 24.95 |
| | 100.00 |

The resulting resin was an oligomer containing 2.5 moles of Mn 1800 epoxy and 1.5 moles of $C_{36}$ dimerized fatty acid, for a total of 3–4 mole units, end terminated with epoxy.

EXAMPLE 3

Mill Base Grind A

| Epoxy-ester of ex. 1 | 27 |
|---|---|
| Solvesso 150 hydrocarbon solvent (Esso) | 10.6 |
| Bentone 34 clay (National Lead) | 0.6 |
| Butanol | 1.0 |
| Mix high speed mixer 30 min | |
| $TiO_2$ Hombitan R-611 (Pigment Chemie) | 53 |
| Bayferrox 910 Black iron oxide pigment (Bayer) | 5 |
| Butanol | 2 |
| MPA 60X viscosity modifier | 0.8 |
| (Baker Castor Oil Co.) | |
| | 100.0 |

Grind to a fineness of 10–15 microns using conventional techniques such as sandmill or Dynomill equipment.

EXAMPLE 4

Mill Base Grind B

| Epoxy-ester of ex. 1 | 26 |
|---|---|
| Solvesso 150 | 10 |
| Bentone 24 | 0.8 |
| Butanol | 2 |
| High speed mixer 30 min | |
| $TiO_2$ Hombitan R 611 | 50 |
| Carbon black pigment Printex G (Degussa) | 1.35 |
| Butanol | 1.35 |
| Guaiacol antioxidant (Rhone-Poulenc) | 0.50 |
| Solvesso 150 | 8 |
| | 100.00 |

Grind to a fineness of 10–15 microns

EXAMPLE 5

Let down A

| Mill base grind A or B | 14 |
|---|---|
| Epoxy ester of ex. 1 or 50/50 blend of ex. 1 and 2 | 53 |
| Setamine US11 | 5 |
| Reactive urea formaldehyde resin (Synthese) | |
| Maprenal MF 590 | 6 |
| Reactive melamine formaldehyde resin (Hoechst) | |
| Modaflow solution 50% xylene (Monsanto) | 0.075 |
| Solvesso 100 | 8 |
| Solvesso 200 | 4 |
| Butyldioxitol-diethylene glycol monobutyl ether (Shell) | 3 |
| Xylene | 7 |
| | 100.075 |

Reduce with more xylene to a viscosity of 30–35 sec in Ford Cup 4 to bring to a sprayable viscosity.

EXAMPLE 6

Let down B

| Mill base grind A or B | 19 |
|---|---|
| Epoxy ester of ex. 1 or 50/50 blend of ex. 1 & 2 | |
| Epoxyester dispersion of Syloid 167 (9%) | 23 |
| Setamine US11 | 5 |
| Maprenal MF 590 | 6 |
| Baysilon oi (1% xylene) (Bayer) | 6 |
| Solvesso 100 | 6 |
| Butyloxitol acetate (Shell) | 9 |
| | 100 |

Tests of ex. 5 and 6 Paints

The paints made in ex. 5 and 6 were tested individually as follows.

A phosphated steel substrate was cathodically electrocoated to a dry film thickness of 15–20 μm of paint and baked 30 min. at 200° C. The chip resistant primer surfacer was sprayed on to a dry film thickness of 30–40 μm and baked for 30 min. at 140° C. or for 20 min. at 170° C. Then a commercial acrylic or alkyd topcoat of 40–50 μm and baked for 30 min. at 140° C. The resulting painted substrates were subjected to the above described Gravelometer test at −18° C. and +25° C. and gave desirable results of 1–2.

To improve several properties including solvent resistance, corrosion resistance and other properties of the chip resistant primer surfacers of ex. 5 and 6, these developments can be combined with reactive polyesters, described in ex. 7 and 8.

EXAMPLE 7

Polyester A

| Isophthalic acid (IPA) | 11.583 |
|---|---|
| Phthalic anhydride (PA) | 3.442 |
| Azeleic acid (AzAc) | 19.684 |
| Neopentylglycol (NPG) | 18.105 |
| Trimethylolpropane (TMP) | 5.831 |
| Dibutyltin oxide (DBTO) | 0.052 |

Charge to a reactor equipped with a packed column. Heat to 220° C. with a temperature of 103° C. maximum at the top of the packed column, for 7 to 8 hours to strip off all the water of reaction. When viscosity increases to U-V and the AN is in the range of 6-10, both measured at 65% solids in xylene, then add:

| | |
|---|---|
| Xylene | 28 |
| | 86.695 |
| water loss | −6.695 |
| | 80.000 |

EXAMPLE 8

Polyester B

| | |
|---|---|
| IPA | 21.977 |
| Adipic acid (AdAc) | 6.555 |
| Maleic anhydride (MalAn) | 4.384 |
| NPG | 21.490 |
| Trimethylol propane (TMP) | 4.881 |
| DBTO | 0.052 |
| Charge to a reactor equipped with a packed column. Heat to 220° C. with a temperature of 103° C. maximum at the top of the packed column, to an AM of 8-12 at visc $Z_1$-$Z_3$ in blend Solvesso 100/cellosolve acetate/-Butanol - 7/2/1 | |
| Solvesso 100 | 19.600 |
| Cellosolve acetate | 5.600 |
| Butanol | 2.800 |
| | 87.198 |
| water loss | −7.198 |
| | 80.000 |

EXAMPLE 9

Mill Base C

| | |
|---|---|
| Polyester A of ex. 7 | 22.15 |
| Solvesso 150 | 10.66 |
| Bentone 34 | 0.64 |
| plus Butanol | 1.08 |
| Solvesso 150 | 4.00 |
| TiO$_2$ Hombitan R611 | 55.13 |
| Carbon black Special 4 (Degussa) | 1.44 |
| Butanol | 2.13 |
| Guaiacol | 0.53 |
| MPA 60X Viscosity modifier | 0.85 |
| | 100.00 |

Grind to fineness 10-15 microns

EXAMPLE 10

Let down of Epoxyester B and Polyesters A and B combined

| | |
|---|---|
| Mill Base C | 14.24 |
| Epoxy ester of ex. 2 | 29.22 |
| Polyester A of ex. 8 | 12.59 |
| Polyester B of ex. 9 | 8.69 |
| Epon 1001 | 5.57 |
| Setamine US11 | 6.15 |
| Luwipal LR 8607 - Reactive methylated Melamine formaldehyde (BASF) | 5.73 |
| Butanol | 2.20 |
| Methyl Proxitol propylene glycol ether (Shell) | 9.90 |
| Modaflow solution | 9.90 |
| Butyl glycol | 5.57 |

Reduce with xylene to a viscosity of 30-35 sec in Ford cup 4 to bring to a sprayable viscosity. The PVC was 5.6%.

Tests of ex. 10 Paint

The paint made in ex. 10 was tested as follows:

A phosphated steel substrate was cathodically electrocoated to a dry film thickness of 15-20 μm of paint and baked 30 min. at 200° C. Then the chip resistant primer surfacer was sprayed on to a dry film thickness of 30-40 μm and baked for 30 min. at 140° C. or for 20 min. at 170° C. Then a commercial acrylic or alkyd topcoat of 40-50 μm and baked for 30 min. at 140° C. The resulting painted substrates were subjected to the above described Gravelometer test at −18° C. and 25° C. and gave desirable results of 1-2.

We claim:

1. A chip resistant coating paint composition consisting essentially of a block-copolymerized linear oligomer having an average of 3 to 20 mole units of alternating units of
   n moles of linear epoxy oligomers made by reacting epichlorohydrin and bisphenol A and terminated with oxirane groups on each end and an $\overline{Mn}$ in the range of 300-2000, and
   (n−1) moles of fatty acid units terminated with carboxylic acid groups on each of two ends and having at least 9 carbon atoms,
   said linear oligomer being terminated on each end with units of said epoxy oligomers
   said coating composition having a pigment volume concentration in the range of 1 to 20 percent.

2. A coating composition of claim 1 wherein the pigment consists essentially of at least one of titanium dioxide and barium sulfate.

3. A coating composition of claim 1 wherein the pigment volume concentration is about 5 percent.

4. A coating composition of claim 1 which also contains a polyester resin.

* * * * *